United States Patent
Aronson et al.

(10) Patent No.: US 7,580,638 B2
(45) Date of Patent: *Aug. 25, 2009

(54) OPTICAL TRANSCEIVER MODULE WITH MULTIPURPOSE INTERNAL SERIAL BUS

(75) Inventors: Lewis B. Aronson, Los Altos, CA (US); Lucy G. Hosking, Santa Cruz, CA (US); Greta L. Light, San Mateo, CA (US); Darin James Douma, Monrovia, CA (US); Mark J. Farley, Napa, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/169,025

(22) Filed: Jun. 27, 2005

(65) Prior Publication Data

US 2005/0249468 A1 Nov. 10, 2005

Related U.S. Application Data

(63) Continuation of application No. 10/266,870, filed on Oct. 8, 2002, now Pat. No. 6,912,361.

(51) Int. Cl.
*H04B 10/00* (2006.01)
(52) U.S. Cl. .................................... 398/137; 398/136
(58) Field of Classification Search .......... 398/135–139
See application file for complete search history.

(56) References Cited

U.S. PATENT DOCUMENTS

| | | | |
|---|---|---|---|
| 5,404,460 A * | 4/1995 | Thomsen et al. .......... 710/9 |
| 5,664,231 A * | 9/1997 | Postman et al. ........... 710/73 |
| 5,926,303 A | 7/1999 | Giebel et al. | |
| 5,929,982 A * | 7/1999 | Anderson ................. 356/73.1 |
| 5,974,475 A * | 10/1999 | Day et al. ................. 710/9 |
| 6,160,647 A * | 12/2000 | Gilliland et al. ........... 398/23 |
| 6,313,459 B1 | 11/2001 | Hoffe et al. | |
| 6,488,416 B1 * | 12/2002 | Shishikura et al. ....... 385/88 |
| 6,504,635 B1 | 1/2003 | Nakashima | |
| 6,512,617 B1 | 1/2003 | Tanji et al. | |
| 6,693,932 B2 | 2/2004 | Akashi et al. | |
| 6,912,361 B2 * | 6/2005 | Aronson et al. ........... 398/135 |

FOREIGN PATENT DOCUMENTS

| | | |
|---|---|---|
| CN | 2413441 Y | 1/2003 |
| EP | 0 971 490 A1 | 1/2000 |
| WO | WO 98/00943 | 1/1998 |

* cited by examiner

*Primary Examiner*—Christina Y Leung
(74) *Attorney, Agent, or Firm*—Workman Nydegger

(57) ABSTRACT

The optical-transceiver module includes an optical transmitter and an optical receiver. The optical transceiver module also includes an internal serial bus and a plurality of addressable components electrically coupled to the internal serial bus. Each of the addressable components included a serial interface for communicating with the internal serial bus, and a memory. Each addressable component also includes a unique address or chip select logic coupled to a controller via a chip select line. This allows data to be addressed to specific addressable components. The addressable components may include a laser driver, a laser bias controller, a power controller, a pre-amplifier, a post-amplifier, a laser wavelength controller, a main controller, a electrothermal cooler, an analog-to-digital converter, a digital-to analog converter, an APD bias controller, or any combination of the aforementioned components.

13 Claims, 7 Drawing Sheets

OPTICAL TRANSCEIVER MODULE WITH MULTIPURPOSE INTERNAL SERIAL BUS

CROSS-REFERENCE TO RELATED APPLICATIONS

This application is a Continuation, and claims the benefit, of U.S. patent application Ser. No. 10/266,870, filed Oct. 8, 2002 and entitled OPTICAL TRANSCEIVER MODULE WITH MULTIPURPOSE INTERNAL SERIAL BUS (now issued as U.S. Pat. No. 6,912,361), which is hereby incorporated herein by reference.

BACKGROUND OF THE INVENTION

1. Field of the Invention

The present invention relates generally to the field of fiber optic transceivers and particularly to an optical transceiver having a multipurpose internal serial bus used to accomplish setup, control, monitoring, and safety operations.

2. Description of Related Art

Fiber optic transceivers, otherwise know as optoelectronic transceivers, transmit and receive both light and electronics signals, i.e., they provide for the bi-directional communication of signals between an electrical interface and an optical interface.

FIG. 1 is a schematic representation of the circuitry and components found in various prior-art fiber optic transceivers 100. The fiber optic transceiver 100 includes a circuit board 102 that contains at a minimum a receiver circuit, a transmit circuit, a power connection 104, and a ground connection 106.

The receiver circuit receives relatively small optical signals at an optical detector and amplifies and limits the signals to create a uniform amplitude digital electronic output. The receiver circuit typically consists of a Receiver Optical Subassembly (ROSA) 108, which typically includes a fiber receptacle as well as a photodiode and pre-amplifier (preamp) circuit. The ROSA 108 is in turn connected to a post-amplifier (postamp) integrated circuit (IC) 110, which generates a fixed output swing digital signal which is connected to outside circuitry via RX+ and RX– pins 112. The postamp IC 110 also often provides a digital output signal known as Signal Detect (SD), or Loss of Signal (LOS), indicating the presence or absence of a suitably strong optical input. This Signal Detect (SD) output is provided via a SD output pin 114.

The transmitter circuit, or laser driver circuit, accepts high speed digital data and electrically drives a Light Emitting Diode (LED) or laser diode to create equivalent optical pulses. The transmit circuit typically consists of a Transmitter Optical Subassembly (TOSA) 116 and a laser driver IC 118. The TOSA 116 typically includes a fiber receptacle as well as a laser diode or LED. The laser driver IC 118 typically includes an alternating current (AC) driver to provide AC current to the laser diode or LED. The laser driver IC 118 also typically includes a direct current (DC) driver to provide bias current to the laser diode or LED. The signal inputs for the AC driver are obtained from TX+ and TX– pins 120.

In addition, some optical transceiver standards require additional transceiver functionality. For example, the GigaBit Interface Converter (GBIC) standard requires eye safety and general fault detection functionality. This functionality is used to identify abnormal and potentially unsafe operating parameters and to report these to the user and/or perform laser shutdown, if appropriate. This functionality may be integrated into the laser driver IC 118 itself or into an optional eye safely IC 122. To enable this functionality, TX disable 124 and TX fault 126 pins are provided. The TX disable pin 124 allows the TOSA 116 to be shut off by a host device, while the TX fault pin 124 communicates a fault condition in the laser, or associated laser driver IC 118, to the host device. In addition to this basic description, the GBIC standard includes a series of timing diagrams describing how these controls function and interact with each other to implement reset operations and other actions. The GBIC standard also requires an Electrically Erasable Programmable Read Only Memory (EEPROM) 128 to store standardized serial identification (ID) information that can be read via a serial interface (defined as using the serial interface of the ATMEL AT24C01A family of EEPROM products) consisting of clock 130 and data 132 lines.

In use, various components, such as the laser driver IC 118, typically require individual setup and adjustment. Setup of these components generally occurs each time the optical transceiver is powered-up, as the individual components generally have volatile memories that lose setup data when powered-down. Adjustment, on the other hand, is typically required to account for variations in component characteristics, such as laser diode threshold current and slope efficiency either on a part to part basis or based on temperature. Parameters that are adjusted are: bias current and AC modulation. This setup and adjustment is generally performed on each optical transceiver by adjusting variable resistors or by connecting resistors 134, having factory selected resistance values, to the laser driver IC 118. Additionally, temperature compensation of the bias current and modulation is often required, which is important to key laser characteristics, such as slope efficiency. Temperature compensation can be integrated into the laser driver IC 118 or accomplished through the use of external temperature sensitive elements, such as thermistors 136.

The above described optical transceiver has a number of drawbacks. For example, it is time consuming and costly to detect the variations of the various components, select the correct resistors 134 and thermistors 136 (or adjust the variable resistors), and/or install these on the circuit board 102 of the optical transceiver 100. In addition, such resistors and/or thermistors take up valuable space on the circuit board 102. Moreover, each time additional features are added to the optical transceiver, the complexity of the circuitry increases significantly. For example, in use, as many as twelve connections may be needed to the transmitter circuit, thereby significantly increasing circuitry complexity. Still further, such prior art systems are generally not scalable, i.e., they cannot easily be expanded to allow additional functionality.

More recently, analog signal lines have been introduced to setup and adjust these components. The analog signals lines may include analog inputs 138, such as bias current, modulation amplitude, and disable inputs, or analog outputs 140, such as actual bias, temperature, and output power. However, these analog signals lines do not address many of the drawbacks of the abovementioned prior art. For example, a high number of inputs and outputs are still required, which leads to complex circuitry that takes up a significant amount of space on the circuit board 102. These optical transceivers are still not scalable.

Dedicated digital connections, such as serial input 142 and output 144 connections, to these components have been introduced. An example of a digital output is a fault indicator, e.g., indicating that the transceiver module is running too hot. Optical transceivers employing these dedicated digital connections typically include a controller IC 148 located either within, or outside, the optical transceiver 100. Inputs and/or outputs 150 between the host and the controller IC 148 are typically also provided. However, optical transceivers employing dedicated digital connections do not fully address the abovementioned drawbacks. For example, the circuitry is still highly complex, especially for multiple inputs/outputs. This circuitry, as in other prior art optical transceivers, takes up valuable circuit board space.

In light of the above, an optical transceiver that addresses the abovementioned drawbacks would be highly desirable. In particular, such an optical transceiver should be simple to manufacture and operate; reduce complexity by providing a simple circuitry layout; use a minimal amount of circuit board space; and allow for scalability.

SUMMARY OF THE INVENTION

According to the invention there is provided an optical transceiver module. The optical transceiver module includes an optical transmitter, such as a laser in a TOSA, and an optical receiver, such as a PIN detector in a ROSA. The optical transceiver module also includes an internal serial bus and a plurality of addressable components electrically coupled to the internal serial bus. Each of the addressable components includes a serial interface for communicating with the internal serial bus, and a memory. Each addressable component also includes a unique address, or chip select logic coupled to a controller via a chip select line. This allows data to be addressed to specific addressable components. The addressable components may also include an analog to digital converter and/or a digital to analog converter. The plurality of addressable components may include components selected from a laser driver, a laser bias controller, a power supply circuit or controller, a pre-amplifier, a post-amplifier, a laser wavelength controller, a main controller, a thermoelectric cooler (TEC), an analog-to-digital converter, a digital-to analog converter and/or an APD bias controller, or any combination of these components.

Consequently, the above described transceiver module includes a single, shared internal serial bus that connects to numerous components in the transceiver module. This allows a plurality of functions to be performed via a single electrical connection to each component. Also, overall system complexity is reduced by eliminating the need for multiple analog or digital lines to each component. This conserves valuable board area for other components or circuitry and may even allow for a more compact transceiver module. In addition, the internal serial bus allows for scalability. For example, new integrated circuits (ICs) may be coupled to the internal serial bus, thereby sharing input and output ports on the main controller. These input and output ports are generally used for sending setup commands to the ICs or receiving monitoring information from the ICs. In addition, new ICs having additional functionality or features may be swapped with existing ICs without requiring any additional input and output ports, i.e., adding functionality with little circuit redesign.

Moreover, the above described transceiver module provides more complete and accurate control and monitoring of the transceiver module's parameters.

BRIEF DESCRIPTION OF THE DRAWINGS

For a better understanding of the nature and objects of the invention, reference should be made to the following detailed description, taken in conjunction with the accompanying drawings, in which.

Figure 1:
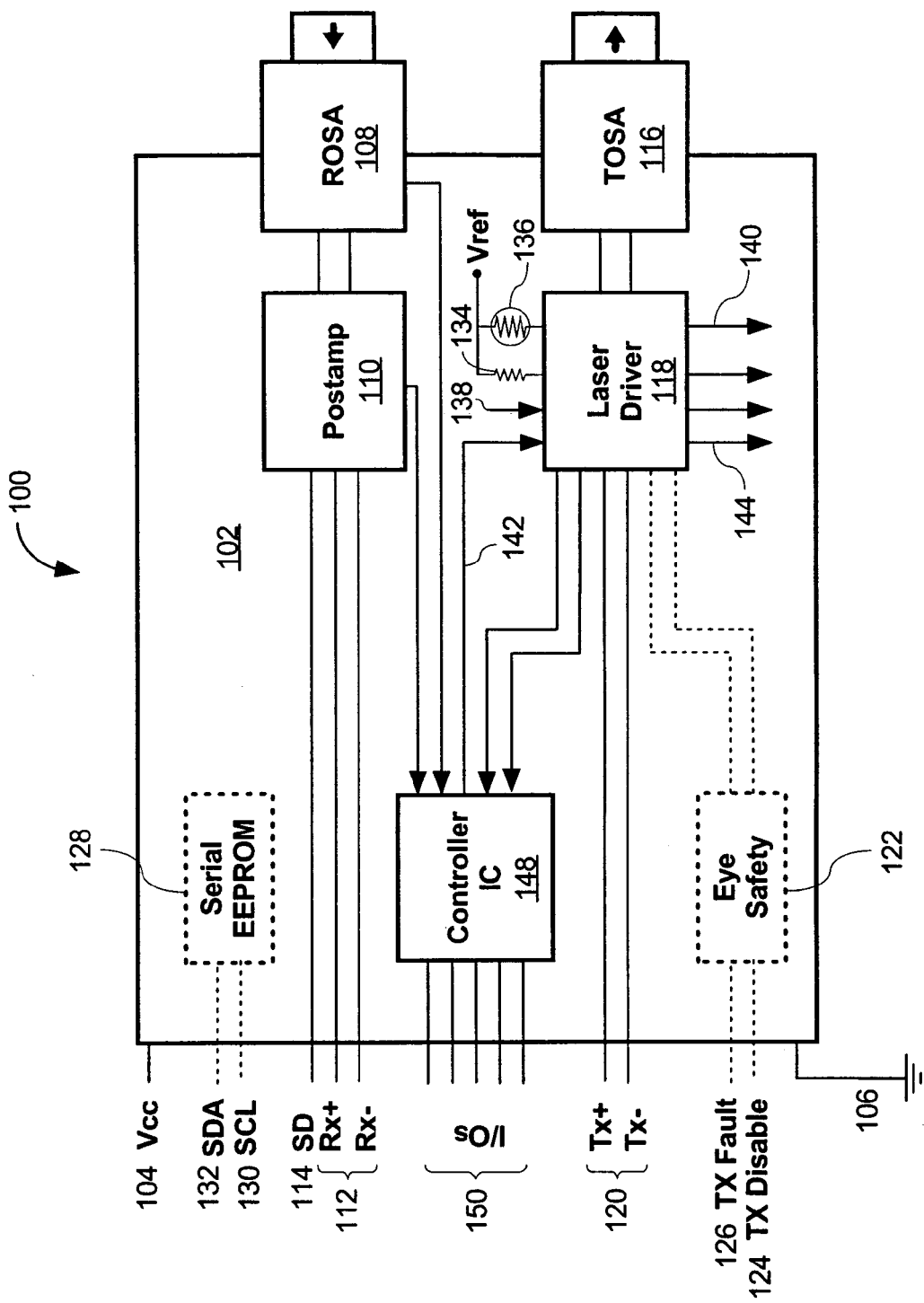
FIG. 1 is a schematic representation of the circuitry and components of various prior-art fiber optic transceivers.

Like reference numerals refer to corresponding parts throughout the several views of the drawings. For ease of reference, the first number of any reference numeral generally indicates the figure number in which the reference numeral can be found. For example, 132 can be found in FIG. 1, and 304 can be found in FIG. 3.

DETAILED DESCRIPTION OF PREFERRED EMBODIMENTS

The present invention utilizes a shared internal serial bus to communicate with multiple addressable components in an optical transceiver module. As will be shown, the shared serial bus simplifies overall transceiver setup, control, monitoring, and safety functions, while reducing system complexity, freeing-up valuable board space, and allowing for scalability. In a preferred embodiment, the serial bus monitors: laser bias current from the laser bias controller; laser output power; received average power; received modulated power; APD bias voltage; temperature; current in a thermoelectric cooler (TEC) controller; temperature in the TEC controller; wavelength; error rates; signal integrity; or the like.

Figure 2A:
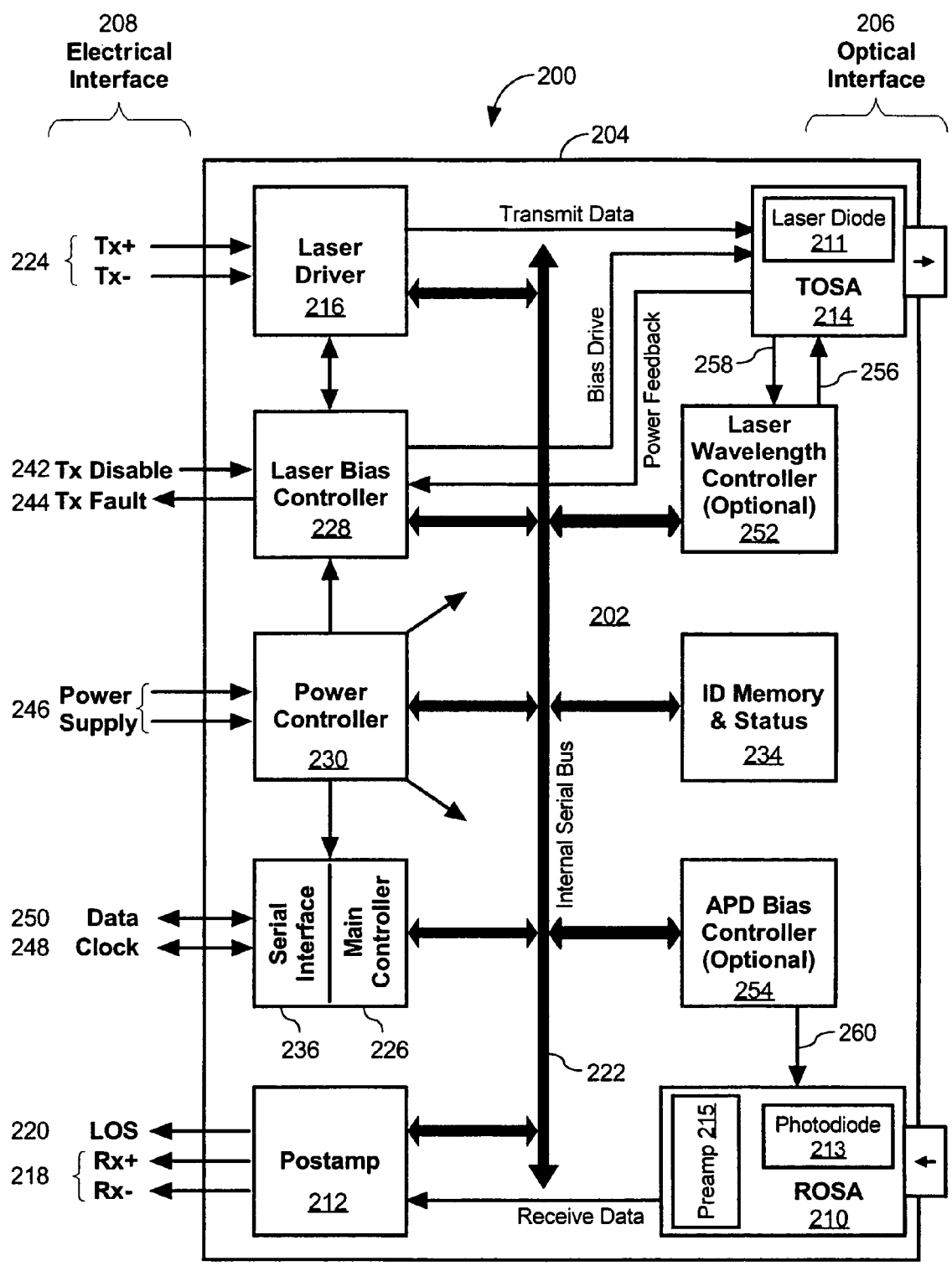
FIG. 2A is a schematic representation of the circuitry and components of an optical transceiver module that uses a component address serial protocol, according to an embodiment of the invention.

FIG. 2A is a schematic representation of the circuitry and components of an optical transceiver module that uses a component address serial protocol, according to an embodiment of the invention. The transceiver module 200 preferably includes at least one circuit board 202 having multiple addressable components disposed thereon. The transceiver module 200 is preferably at least partially contained within a transceiver housing 204. The transceiver module 200 includes an optical interface 206 for receiving and transmitting optical signals, and an electrical interface 208 for receiving and transmitting electrical signals. The transceiver module 200 contains a ROSA 210 electrically coupled to a post-amplifier IC 212, and a TOSA 214 electrically coupled to a laser driver IC 216.

The ROSA 210 receives relatively small optical signals at an optical receiver or detector, such as a photodiode 213. These signals are converted to electrical signals and amplified by the post-amplifier IC 212 to create a uniform amplitude digital electronic output, which is transmitted to external circuitry via RX+ and RX− pins 218. The post-amplifier IC 212 also preferably provides a digital output signal known as Signal Detect (SD), or Loss of Signal (LOS), at LOS pin 220, indicating the presence or absence of a suitably strong optical input.

In a preferred embodiment, the small optical signals received at the ROSA are first amplified by a pre-amplifier IC 215, generally located within the ROSA package, before being sent to the post-amplifier IC 212. In an alternative embodiment, the pre-amplifier IC 215 is coupled directly to a shared serial bus 222.

The post-amplifier IC 212 is also preferably an addressable component electrically coupled to a shared serial bus 222 via a serial connection. The shared serial bus 222 is preferably located on the circuit board 202, at least partially internal to the transceiver housing 204. A number of digital signals and/or data may be communicated between the post-amplifier IC 212 and the main controller 226, or other devices within the transceiver, via the shared serial bus 222. Such digital signals and/or data may include: output amplitude setting data, slew rate data, LOS thresholds and status data, equalization data, received signal power, loss of signal data, or a subset of these.

The laser driver IC 216 accepts high speed digital data from external circuitry to electrically drive the TOSA 214 to create equivalent optical pulses. The TOSA 214 preferably contains an optical transmitter, such as a LED or laser diode 211. The laser driver IC 216 preferably includes an AC driver to provide AC current to the laser diode or LED. The signal inputs for the laser driver IC 216 are obtained from TX+ and TX− pins 224.

The laser driver IC 216 is also preferably an addressable component electrically coupled to the shared serial bus 222 via a serial connection. A number of digital signals and/or data may be communicated between the laser driver IC 216 and the main controller 226, or other devices within the transceiver module 200, via the shared serial bus 222. Such digital signals and/or data may include: modulation amplitude data, slew rate data, equalization data, other control parameters or monitoring data, or any subset of these.

The transceiver module 200 also preferably includes a number of other addressable components, such as a main controller IC 226, a laser bias controller IC 228, a power controller IC 230, and an ID memory and status IC 234, or a subset of these. Each of the aforementioned addressable components is electrically coupled to the shared internal serial bus 222 via a separate serial connection.

The main controller IC 226 implements most setup, control, and monitoring functions of the transceiver module 200, such as temperature compensation, diagnostic feedback, variation adjustments and calibration, or the like. The main controller IC 226 also acts as the serial bus master for the shared serial bus 222. Although not shown, the main controller IC 226 preferably includes a non-volatile memory. Further description of a similar main controller IC can be found in co-pending U.S. patent application Ser. No. 09/777,917, which is incorporated herein by reference.

The laser bias controller IC 228 is used to control key parameters of the laser driver IC 216 and the TOSA 214, such as safety and general fault detection functionality. This functionality is used to identify abnormal and potentially unsafe operating parameters and to report these to the user and/or perform laser shutdown, if appropriate. To enable this functionality, TX disable 242 and TX fault 244 pins are provided. The TX disable pin 242 allows the TOSA 214 to be shut off by a host device. The TX fault pin 244 communicates a fault condition in the laser or LED, or associated laser driver IC 216, to a host device (not shown).

In one embodiment, the laser bias controller IC 228 is also preferably electrically coupled directly to the TOSA 214. This direct electrical connection to the TOSA 214 is used to directly control the laser bias current and the AC modulation level to the TOSA 214, thereby operating the laser driver in a constant bias mode operation. A direct electrical connection to the TOSA 214 is also preferably used to receive a laser power feedback from the TOSA 214.

In another embodiment, the outputs of the laser bias controller IC 228 control the level of average output power of the laser driver IC 216 in addition to the AC modulation level, thereby operating the laser driver in a constant power mode operation.

The laser bias controller IC 228 is also electrically coupled to the shared serial bus 222 via a serial connection. A number of digital signals and/or data may be communicated between the laser bias controller IC 228 and the serial bus 222. Such digital signals and/or data include: bias settings and status, power settings and status, error thresholds and status, temperature compensation settings, other control settings, other status signals, or a subset thereof.

The power controller IC 230 provides and regulates power to the transceiver module 200. A power supply is connected to the module 200 at power supply input pins 246. The power controller IC 230 is also electrically coupled to all components that require a power supply. The power controller IC 230 is also electrically coupled to the serial bus 222 via a serial connection. A number of digital signals and/or data may be communicated between the power controller IC 230 and the main controller 226, or other devices within the transceiver module 200, via the serial bus 222. Such digital signals and/or data include: voltage commands, voltage and current status, temperature, power down or sleep mode, control signals, step-up signals, step-down signals, surge control functions, or the like. The power controller IC 230 preferably includes two or more voltage regulators, with each voltage regulator providing either a fixed or programmable voltage that can be supplied to one or more of the components of the transceiver module 200. The power controller IC 230 is coupled to each of the other components of the transceiver module 200 that require regulated power. Since each of the components or IC's in the transceiver 200 potentially requires a different regulated supply voltage, the power controller IC 230 may be implemented using multiple integrated circuits, including two or more voltage regulator IC's and a logic circuit IC.

A host serial interface controller 236, coupled directly to the main controller 226, communicates with a host device (not shown). The host serial interface controller 236 couples to a host serial bus (not shown) via clock 248 and data 250 lines. The host serial interface controller 236 is used for all setup and querying of the main controller IC 226. In a preferred embodiment, the host serial interface controller 236 operates in accordance with a two wire serial interface standard that is used in the GBIC and SFP (Small Form Factor Pluggable) standards. A host serial-bus (not shown), coupled to the host serial interface controller 236, is preferably an I2C (Inter-IC) or MDIO bus. An I2C or $I^2C$ bus is a bidirectional two-wire serial bus that provides a communication link between integrated circuits. An MDIO bus is a Management Data Input/Output bus, as described by the IEEE 802.3 specification. Alternatively, another bi-directional serial interface could be used.

In the embodiment shown in FIG. 2A, the internal serial bus 222 utilizes a component address serial protocol that addresses each addressable component using the component's unique component address 418 (FIG. 4A), as described below. Examples of a suitable component address serial protocol include I2C (or $I^2C$) and MDIO.

In some embodiments the transceiver module 200 also includes a laser wavelength controller IC 252 coupled to the TOSA 214 and to the shared serial bus 222. The laser wavelength controller IC 252 preferably controls the temperature of the laser diode in the TOSA 214 so as to control wavelength of the light generated by the laser diode. A suitable wavelength controller IC 252 is a thermoelectric cooler (TEC). The laser wavelength controller IC 252 may also control the wavelength by any other suitable means, such as voltage, current bias, or the like. Precise control of the laser wavelength is important in wavelength division multiplexing applications, in which light from multiple laser diodes at multiple respective wavelengths is transmitted over a single optical fiber. The light at each wavelength is used to transmit a distinct signal or data stream. The laser wavelength controller IC 252 provides a laser temperature drive 256 to the TOSA 214, and receives laser temperature or wavelength feedback 258 from the TOSA 214.

The laser wavelength controller IC 252 is also preferably an addressable component electrically coupled to the shared serial bus 222 via a serial connection. A number of digital signals and/or data may be communicated between the laser wavelength controller IC 252 and the main controller 226, or other devices within the transceiver module 200, via the shared serial bus 222. Such digital signals and/or data include: temperature and/or wavelength commands and status, temperature control status, temperature control current, and the like, or any subset of these signals and data.

In embodiments where the ROSA 210 includes an avalanche photodiode, the transceiver module 200 preferably also includes an avalanche photodiode (APD) bias control IC 254 coupled to the ROSA 210 and to the shared serial bus 222. The APD bias control IC 254 transmits a bias signal to the ROSA 210 for controlling the operation of the avalanche photodiode in the ROSA 210.

The APD bias control IC 254 is also electrically coupled to the shared serial bus 222 via a serial connection. A number of digital signals and/or data may be communicated between the APD bias control IC 254 and the main controller 226, or other devices within the transceiver module 200, via the shared serial bus 222. Such digital signals and/or data include: bias voltage (command and status), bias current, temperature compensation control and/or monitoring signals, or any subset of these signals.

Figure 2B:
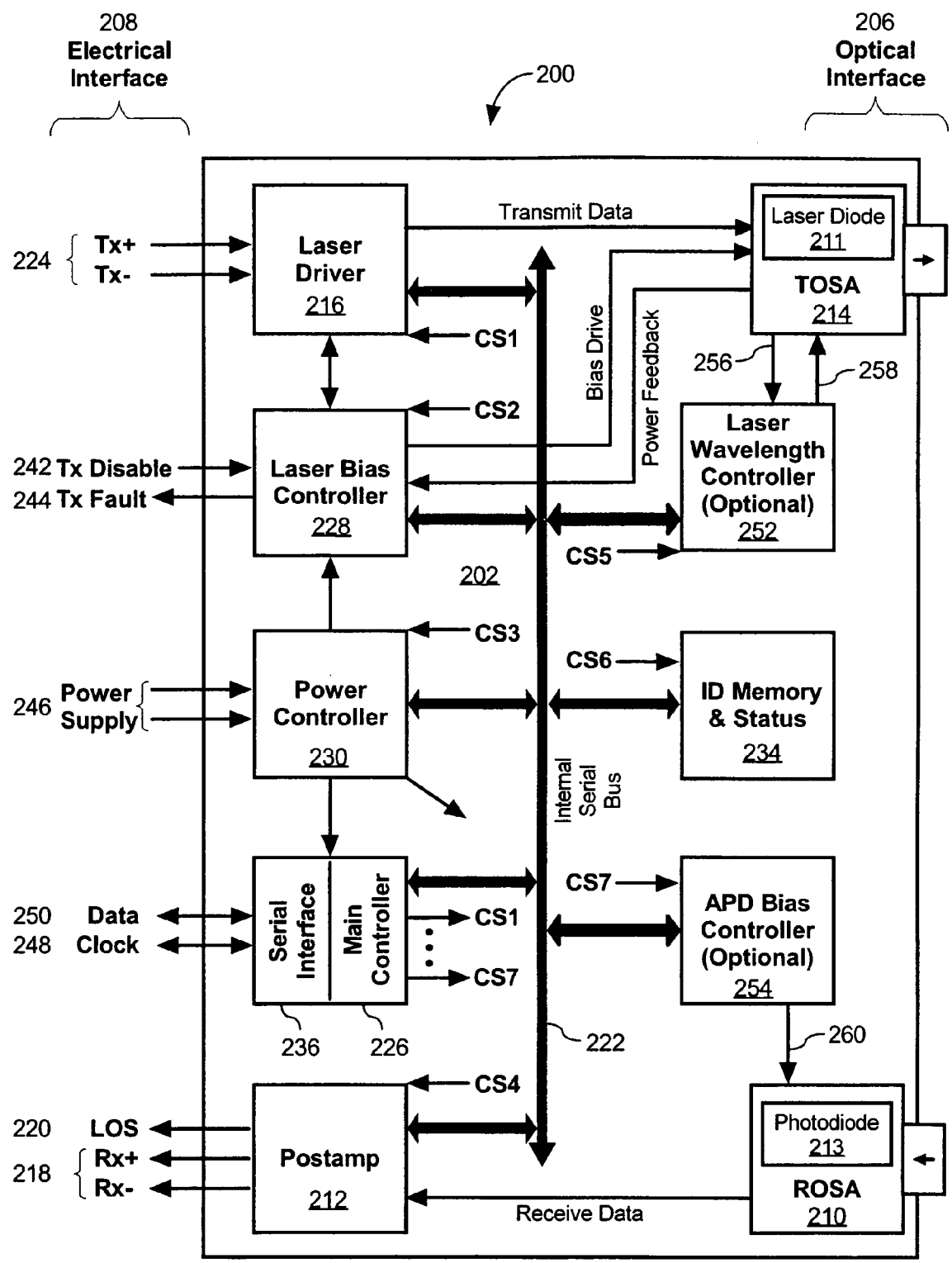
FIG. 2B is a schematic representation of the circuitry and components of an optical transceiver module that uses a chip select serial protocol, according to another embodiment of the invention.

FIG. 2B is a schematic representation of the circuitry and components of an optical transceiver module that uses a chip select serial protocol. This embodiment is identical in all respects to the embodiment described in relation to FIG. 2A, except that the individual addressable components are addressed by dedicated hardware in the form of chip selects, shown as CS1-CS7. Dedicated chip select lines or wires CS1-CS7 couple the main controller 226 (master) to each addressable component (slave). Each chip select is a signal that when true permits input and output of the addressable component's memory, and when false prohibits such input and output. (See the discussion below of component memory 404.) Therefore, in use, each time input or output from an addressable component is required, the main controller 226 (FIG. 2) sends a chip select signal only to that particular addressable component, thereby allowing input or output to that addressable component. It should be appreciated that although only seven chip select lines are shown, either more or less chip select lines may be used.

This embodiment is simpler to manufacture and is less expensive than the embodiment described in FIG. 2A. However, a dedicated chip select line running to each addressable component takes up valuable board area. A suitable chip select serial, protocol is Serial Peripheral Interface (SPI) that utilizes a data-in pin, a data-out pin, a clock pin, and a chip select pin on each component.

Figure 2C:
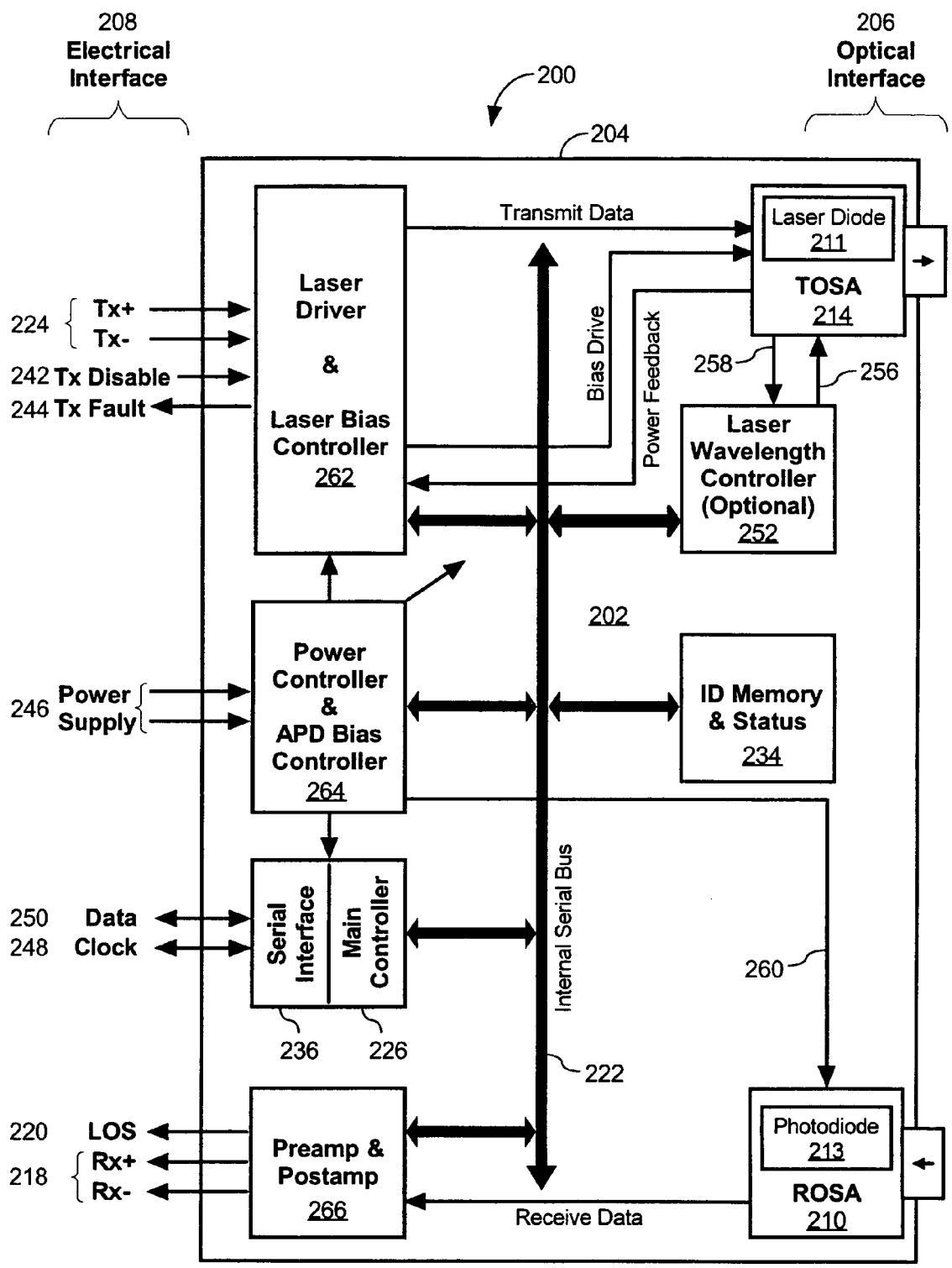
FIG. 2C is a schematic representation of the circuitry and components of an optical transceiver module, according to another embodiment of the invention.

FIG. 2C is a schematic representation of the circuitry and components of an optical transceiver module, according to another embodiment of the invention. This embodiment illustrates that the components within the optical transceiver module may be combined. For example, the optical transceiver module may include a single: laser driver and laser bias controller 262; power controller and APD Bias Controller 264; and pre-amplifier and post-amplifier 266. It should, however, be appreciated that these combined components are merely exemplary and any other combination of components may be used.

Figure 3:
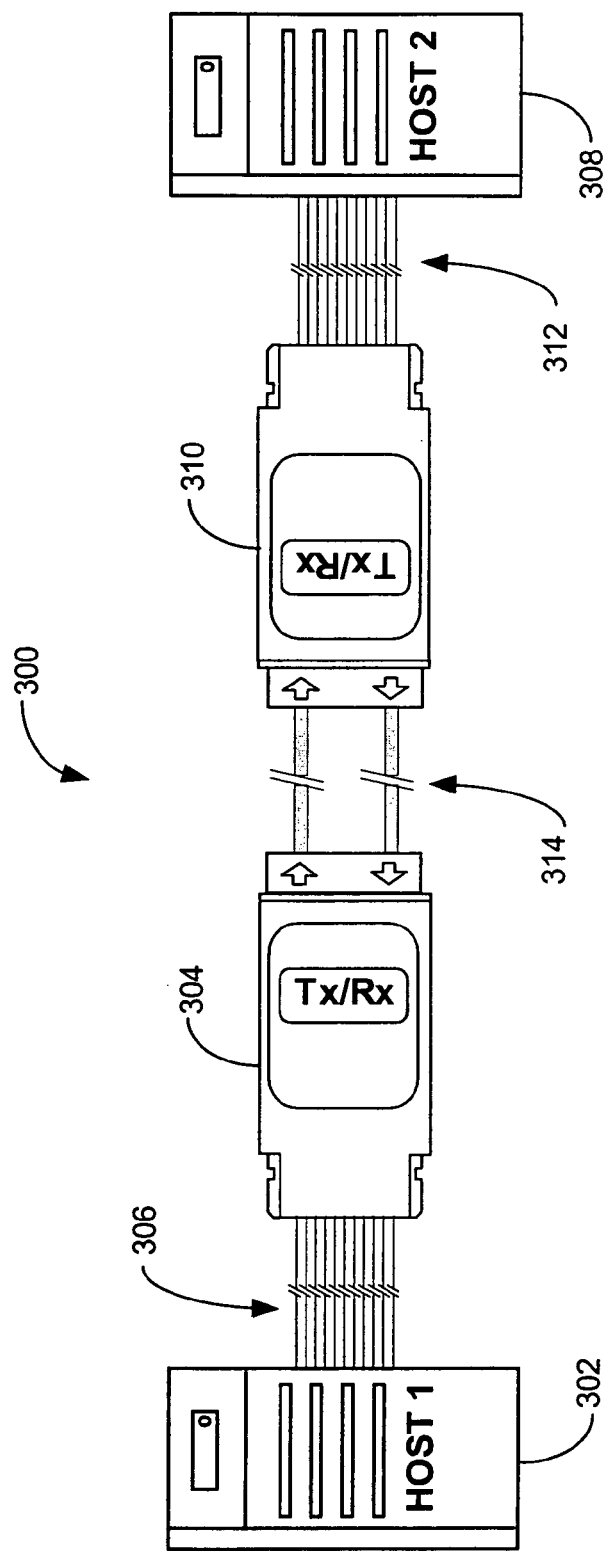
FIG. 3 is a schematic representation of a system utilizing fiber optic transceiver modules similar to that shown in FIGS. 2A and 2B.

FIG. 3 is a schematic representation of a system 300 utilizing fiber optic transceiver modules (also known as opto-electronic transceivers) similar to that shown in FIG. 2. First host 302 is electrically coupled to a first optical transceiver module 304 via electrical links 306. These electrical links 306 preferably connect to the input/output pins of the first optical transceiver module 304. These input/output pins preferably include the connections or pins shown in FIG. 2 as Tx+ and Tx− 224, Tx disable 242, Tx fault 244, the power supply 246, data 250, clock 248, LOS 220, and Rx+ and RX− 218 pins. Likewise, a second host 308 is electrically coupled to a second optical transceiver module 310 via electrical links 312. Also, the first and second optical transceivers 304 and 310 are optically coupled to one another via optical fibers 314, i.e., TOSA to ROSA.

Figure 4A:
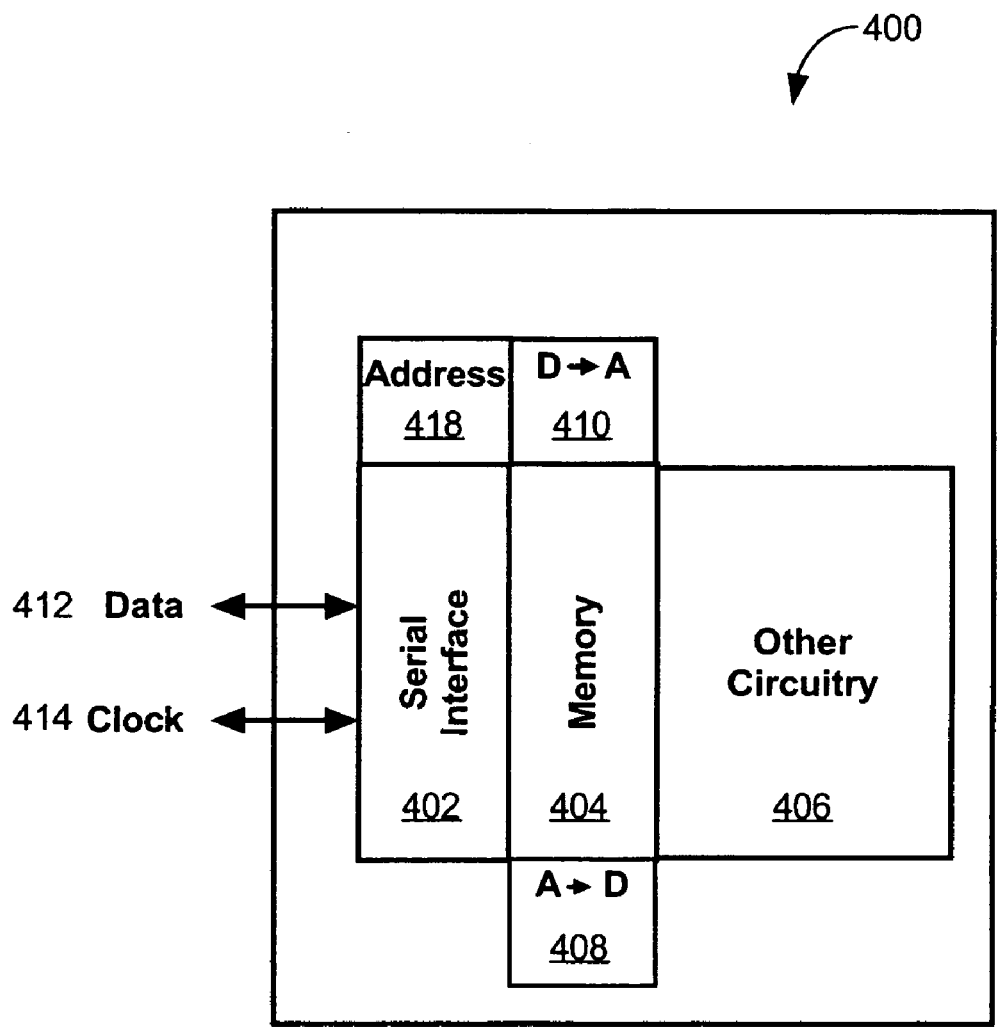
FIG. 4A is a schematic representation of an exemplary addressable component of the optical transceiver module shown in FIG. 2A.

FIG. 4A is a schematic representation of an exemplary addressable component 400 of the optical transceiver module 200 shown in FIG. 2A. As described above, the addressable component 400 is preferably a single integrated circuit (IC). The exemplary addressable component 400 may be any addressable component in the transceiver module 200 that is coupled to the shared serial bus 222 (FIG. 2A or 2B), such as the laser driver IC 216 (FIG. 2A), post-amplifier IC 212 (FIG. 2A), or the like. The addressable component 400 includes a serial interface 402 coupled to the internal serial bus 222 (FIG. 2) via data 412 and clock 414 lines. The serial interface 402 preferably communicates with other devices coupled to the serial bus 222 (FIG. 2) using any suitable signaling protocol, such as a component address serial protocol like I2C or MDIO, as described above in relation to FIG. 2A, or a chip select serial protocol, like SPI, as described above in relation to FIG. 2B.

Each addressable component 400 also preferably includes a memory 404 for storing data, such as monitored variables, commands and/or control parameters received from other components or from a host device, or the like. The memory 404 may include a memory array or one or more registers, or both a memory array and registers, and may include volatile and/or non-volatile memory components or registers. The memory may also include a FIFO, cache, or the like. In some addressable components 400, the memory 404 may have very few memory elements (e.g., command and/or feedback registers) or locations that are used by the component, while other components may have a larger number of memory elements or locations.

The addressable component 400 also preferably includes a digital to analog converter (DAC) 410 for converting digital data received at the serial interface 402 into analog signals that can be used by the addressable component 400. If none of the data or control parameters received by a particular addressable component 400 require conversion into an analog signal, a DAC 410 need not be included in the addressable component. For instance, on/off control parameters received by an addressable component can usually be converted into control signals without the use of a DAC 410. Thus, some of the addressable components 400 in a transceiver module may include a DAC 410 while one or more of the other components do not include a DAC 410.

In addition, the addressable component 400 preferably includes an analog to digital converter (ADC) 408 for converting analog signals to digital signals that can be transmitted to the internal serial bus 222 (FIG. 2) via the data line 412. The analog signals coupled to the ADC 408 are typically voltage or current signals whose magnitude or value is being monitored. If there are no analog signals in the addressable component whose magnitude or value is being monitored, an ADC 408 need not be included in the addressable component. Thus, some of the addressable components 400 in a transceiver module may include an ADC 408 while one or more of the other components do not include an ADC 408.

Other circuitry 406 in the addressable component 400 performs the setup, control, monitoring, and/or safety functions of the addressable component, as described above in relation to FIG. 2.

If the addressable component 400 utilizes a component address serial protocol like I2C or MDIO, as described in relation to FIG. 2A, the addressable component 400 preferably includes a unique address 418, which enables data/signals to be sent to and from a specific addressable component 400 via the shared, internal serial bus 222 (FIG. 2) and data line 412.

Figure 4B:
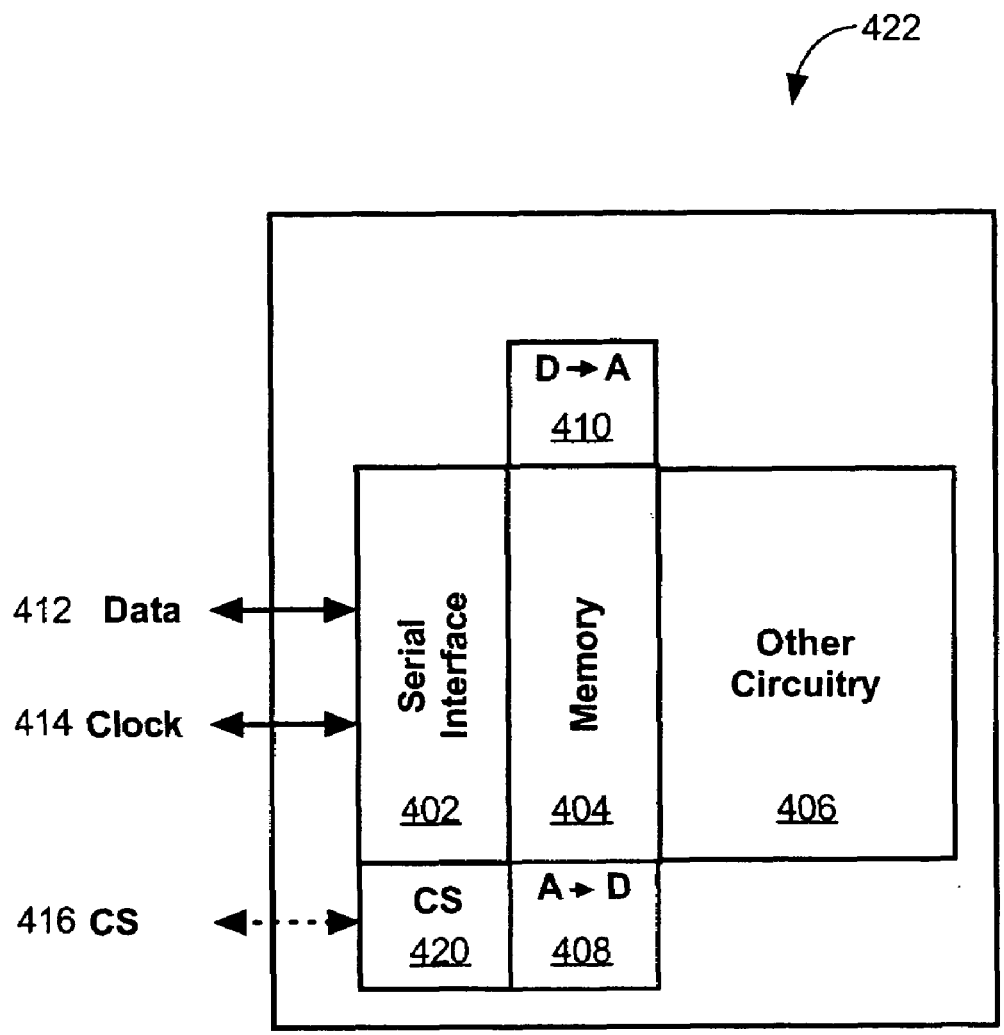
FIG. 4B is a schematic representation of an exemplary addressable component of the optical transceiver module shown in FIG. 2B.

FIG. 4B is a schematic representation of an exemplary addressable component 422 of the optical transceiver module 200 shown in FIG. 2B. This embodiment is identical in all respects to the embodiment described in relation to FIG. 4A, except that the addressable component 422 dos not include an address 418 and rather includes chip select logic 420 coupled to a chip select line 416. This embodiment utilizes a chip select serial protocol, such as SPI, as described in relation to FIG. 2B. In use, each time input or output from an addressable component is required, the main controller 226 (FIG. 2) sends a chip select signal only to that particular addressable component, thereby allowing input or output to that addressable component.

Consequently, the above described transceiver module 200 (FIG. 2) includes a shared internal serial bus 222 (FIG. 2) that connects to a plurality of addressable components 400 (FIG. 4A) or 422 (FIG. 4B) in the transceiver module 200 (FIG. 2). This allows a plurality of functions to be performed via a single digital electrical connection that is coupled to each addressable component. Also, overall system complexity is reduced by eliminating or reducing the need for multiple analog or digital lines to each component. This conserves valuable board area for other components or circuitry and may even allow for a smaller transceiver package or housing 204 (FIG. 2A). In addition, the shared internal serial bus allows for scalability, i.e., allowing additional functionality to be added to a transceiver with very little circuitry redesign.

One use of such a single, shared internal serial bus is to address problems associated with jitter, such as deterministic jitter and in particular pattern dependent jitter. Typically, jitter refers to bit transitions offset in time from the norm, i.e. occurring either before or after a uniformed clocked period. In other words, Jitter is a bit arriving either ahead or behind a standard clock cycle.

To address problems associated with jitter, the main controller 226 (FIG. 2A-2C) recognizes preceding bits or patterns and adjusts a delay to ensure that the bit transitions are not offset in time and occur at a uniformed standard clock cycle.

Any attempt to address jitter in prior art devices would necessitate a separate control line for each delay or source of jitter that is to be adjusted. This solution may not be practical if a large number of separate control lines are required to address a corresponding number of delays or sources of jitter. However, by using a single, shared internal serial bus, the present invention allows for the monitoring and correction of jitter, as only one line or communication bus is needed.

Another advantage is in an embodiment that incorporates the laser driver IC 216 (FIG. 2A) into the TOSA 214 (FIG. 2A). This embodiment would be impractical in the prior art, as too many control and monitoring lines would be needed by the combined component. Again, however, the present invention allows for such a combined component, as only a single, shared serial bus need be connected to the combined component for conveying control signals to the components and for receiving status monitoring information from the component.

It should be appreciated by those skilled in the art that each of addressable components described herein may comprise a single IC, multiple IC's, analog circuitry, a combination of IC's and analog circuitry, or the like. Also, it should be appreciated to those skilled in the art that despite the fact that the preferred embodiment described above utilizes a single, shared serial bus, more than one internal serial bus may be provided in other embodiments of the present invention.

The foregoing descriptions of specific embodiments of the present invention are presented for purposes of illustration and description. They are not intended to be exhaustive or to limit the invention to the precise forms disclosed. Obviously many modifications and variations are possible in view of the above teachings. For example, other embodiments may include fewer or more components, different combinations of components, different serial protocols, or the like. In another example, two or more of the components shown in FIG. 2A may be combined into a single integrated circuit having a single interface to the shared serial bus 222. Such combinations may be advantageous for reasons of cost, shared functionality, packaging requirements, power utilization, or the like. The embodiments were chosen and described above in order to best explain the principles of the invention and its practical applications, to thereby enable others skilled in the art to best utilize the invention and various embodiments with various modifications as are suited to the particular use contemplated. Furthermore, the order of steps in the method are not necessarily intended to occur in the sequence laid out. It is intended that the scope of the invention be defined by the following claims and their equivalents. In addition, any references cited above are incorporated herein by reference.

What is claimed is:

1. An optical transceiver module, comprising:
   a transceiver housing;
   a Transmitter Optical Subassembly (TOSA) disposed at least partially within the housing;
   an optical transmitter, substantially disposed within the TOSA;
   a Receiver Optical Subassembly (ROSA) disposed at least partially within said housing;
   an optical receiver, substantially disposed within the ROSA;
   a plurality of electrical components, each of which are disposed within the housing and each comprising a unique identification logic scheme activation of which permits data to be provided to the selected electrical component;
   a single electrical connection that interconnects the plurality of electrical components, the single electrical connection configured to convey the data for the selected electrical component; and
   a host serial interface controller substantially disposed within the housing, the host serial interface controller configured to couple the single electrical connection to a host system, wherein the plurality of electrical components comprise an interface for communicating with the single electrical connection that interconnects the plurality of electrical components, a memory, an analog-to-digital converter, a digital-to-analog converter, and one of address logic or chip select logic.

2. The optical transceiver module of claim 1, wherein the unique identification logic scheme is comprised of a unique address assigned to each of the electrical components, whereby a component address serial protocol is utilized to provide the data to the selected electrical component.

3. The optical transceiver module of claim 1, wherein the unique identification logic scheme is comprised of a chip select logic, whereby a chip select serial protocol is utilized to provide the data to the selected electrical component.

4. The optical transceiver module of claim 1, wherein each of the electrical components is comprised of a single integrated circuit (IC) comprising circuitry capable of interfacing with the single electrical connection.

5. The optical transceiver module of claim 1, wherein said plurality of electrical components are selected from a group consisting of a laser driver, a laser bias controller, a power controller, a pre-amplifier, a post-amplifier, a laser wavelength controller, a main controller, a electro-thermal cooler, an analog-to-digital converter, a digital-to analog converter, an APD bias controller, or any combination of the aforementioned components.

6. The optical transceiver module of claim 1, wherein the host serial interface controller is coupled directly to a main controller of the optical transceiver module.

7. The optical transceiver module of claim 1, wherein the single electrical connection that interconnects the plurality of electrical components is a serial bus.

8. An optical transceiver module, comprising:
a transceiver housing;
an optical transmitter, substantially disposed within the housing;
an optical receiver, substantially disposed within the housing;
a plurality of electrical components, each of which are disposed within the housing and each comprising a unique identification logic scheme activation of which permits data to be provided to the selected electrical component, wherein each individual component of the plurality of electrical components includes an interface for communicating with the single electrical connection that interconnects the plurality of electrical components and a memory that is part of the electrical component, wherein said plurality of electrical components are selected from a group consisting of a laser driver, a laser bias controller, a power controller, a pre-amplifier, a post-amplifier, a laser wavelength controller, a main controller, a electro-thermal cooler, an analog-to-digital converter, a digital-to analog converter, an APD bias controller, or any combination of the aforementioned components; and
a single electrical connection that interconnects the plurality of electrical components, the single electrical connection configured to convey the data for the selected electrical component.

9. The optical transceiver module of claim 8, wherein the unique identification logic scheme is comprised of a unique address assigned to each of the electrical components, whereby a component address serial protocol is utilized to provide the data to the selected electrical component.

10. The optical transceiver module of claim 8, wherein the unique identification logic scheme is comprised of a chip select logic, whereby a chip select serial protocol is utilized to provide the data to the selected electrical component.

11. The optical transceiver module of claim 8, wherein each of the electrical components is comprised of a single integrated circuit (IC) comprising circuitry capable of interfacing with the single electrical connection.

12. The optical transceiver module of claim 8, wherein the single electrical connection that interconnects the plurality of electrical components is a serial bus.

13. An optical transceiver module, comprising:
a transceiver housing;
an optical transmitter, substantially disposed within the housing;
an optical receiver, substantially disposed within the housing;
a plurality of electrical components, each of which are disposed within the housing and each comprising a unique identification logic scheme activation of which permits data to be provided to the selected electrical component, wherein each individual component of the plurality of electrical components includes an interface for communicating with the single electrical connection that interconnects the plurality of electrical components and a memory that is part of the electrical component; and
a single electrical connection that interconnects the plurality of electrical components, the single electrical connection configured to convey the data for the selected electrical component, wherein each individual component of the plurality of electrical components further comprise:
an analog-to-digital converter
a digital-to-analog converter; and
one of address logic or chip select logic.

* * * * *

UNITED STATES PATENT AND TRADEMARK OFFICE
CERTIFICATE OF CORRECTION

PATENT NO. : 7,580,638 B2  Page 1 of 1
APPLICATION NO. : 11/169025
DATED : August 25, 2009
INVENTOR(S) : Aronson et al.

It is certified that error appears in the above-identified patent and that said Letters Patent is hereby corrected as shown below:

Column 1
Line 22, change "know" to --known--
Line 23, change "electronics" to --electronic--

Column 2
Line 3, change "124" to --126--

Signed and Sealed this

Ninth Day of March, 2010

David J. Kappos
*Director of the United States Patent and Trademark Office*